(12) United States Patent
Nitschke et al.

(10) Patent No.: US 9,792,509 B2
(45) Date of Patent: Oct. 17, 2017

(54) METHOD AND DEVICE FOR DETERMINING A LANE COURSE OF A VEHICLE

(71) Applicants: Robert Bosch GmbH, Stuttgart (DE); Monika Nitschke, Asperg (DE)

(72) Inventors: Werner Nitschke, Asperg (DE); Matthias Marcus Wellhoefer, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/914,940

(22) PCT Filed: Aug. 27, 2014

(86) PCT No.: PCT/EP2014/068134
§ 371 (c)(1),
(2) Date: Feb. 26, 2016

(87) PCT Pub. No.: WO2015/032663
PCT Pub. Date: Mar. 12, 2015

(65) Prior Publication Data
US 2016/0203375 A1    Jul. 14, 2016

(30) Foreign Application Priority Data
Sep. 6, 2013  (DE) .................. 10 2013 217 860

(51) Int. Cl.
*G06K 9/00* (2006.01)
*B60W 30/12* (2006.01)
(Continued)

(52) U.S. Cl.
CPC ............ *G06K 9/00798* (2013.01); *B60R 1/00* (2013.01); *B60W 30/12* (2013.01);
(Continued)

(58) Field of Classification Search
CPC .............. B60R 1/00; B60R 2300/804; B60W 2050/143; B60W 2550/14;
(Continued)

(56) References Cited

U.S. PATENT DOCUMENTS

| 6,819,779 | B1 * | 11/2004 | Nichani | ............. | G06K 9/00798 |
| | | | | | 382/104 |
| 2005/0256636 | A1 * | 11/2005 | Miyashita | .......... | G06K 9/00798 |
| | | | | | 348/148 |

(Continued)

FOREIGN PATENT DOCUMENTS

| DE | 102006038018 | 2/2008 |
| DE | 102006047636 | 4/2008 |

(Continued)

OTHER PUBLICATIONS

International Search Report for PCT/EP2014/068134, issued Dec. 4, 2014.

*Primary Examiner* — Tyler J Lee
(74) *Attorney, Agent, or Firm* — Norton Rose Fulbright US LLP; Gerard Messina

(57) ABSTRACT

A method for determining a course of a lane of a vehicle. In this connection, a first marking course of a first marking of the lane and a second marking course of a second marking of the lane are initially recorded. The first marking course and the second marking course are subsequently checked for plausibility. Finally, the lane course is determined on the basis of a previous width of the lane and a plausible marking course in response to at least one marking course proving to be implausible in the checking step.

15 Claims, 2 Drawing Sheets

(51) Int. Cl.
 *B60R 1/00* (2006.01)
 *B60W 50/14* (2012.01)
(52) U.S. Cl.
 CPC .. *B60R 2300/804* (2013.01); *B60W 2050/143* (2013.01); *B60W 2550/14* (2013.01); *B60W 2550/30* (2013.01); *B60W 2720/10* (2013.01); *B60W 2900/00* (2013.01)
(58) Field of Classification Search
 CPC ......... B60W 2550/30; B60W 2720/10; B60W 2900/00; B60W 30/12; G06K 9/00798
 USPC .................................. 701/36, 70, 300–302
 See application file for complete search history.

(56) References Cited

U.S. PATENT DOCUMENTS

| | | | | |
|---|---|---|---|---|
| 2008/0109118 | A1* | 5/2008 | Schwartz | G06K 9/4609 701/1 |
| 2008/0291276 | A1* | 11/2008 | Randler | B62D 1/28 348/149 |
| 2008/0317288 | A1* | 12/2008 | Aoki | G06K 9/00798 382/104 |
| 2010/0189306 | A1* | 7/2010 | Kageyama | G06K 9/00798 382/104 |
| 2012/0033074 | A1* | 2/2012 | Spangenberg | G06K 9/00798 348/148 |
| 2012/0057757 | A1* | 3/2012 | Oyama | G06K 9/00798 382/104 |
| 2012/0226392 | A1* | 9/2012 | Kataoka | G08G 1/167 701/1 |
| 2015/0227799 | A1* | 8/2015 | Kataoka | G06K 9/4604 382/199 |

FOREIGN PATENT DOCUMENTS

| | | |
|---|---|---|
| DE | 102010032063 | 5/2011 |
| JP | -11031799 A | 2/1998 |
| JP | 2003044836 A | 2/2003 |
| JP | 2010092416 A | 4/2010 |
| JP | 2010218528 | 9/2010 |
| JP | 2010271999 A | 12/2010 |
| JP | 2012128748 A | 7/2012 |

* cited by examiner

METHOD AND DEVICE FOR DETERMINING A LANE COURSE OF A VEHICLE

FIELD

The present invention relates to a method for determining a lane course of a vehicle, to a corresponding device, as well as to a corresponding computer program product.

BACKGROUND INFORMATION

Today's vehicles can be equipped with lane keeping systems and lane departure warning systems. Such systems are already mandatory for trucks. In this context, a camera can capture an image of a field surrounding a vehicle. For example, an image analysis can ascertain a horizon and boundaries of a lane of the vehicle.

SUMMARY

Against this background, the present invention provides a method and a device for determining a lane course of a vehicle, as well as a corresponding computer program product in accordance with the main claims. Advantageous embodiments are described below.

In accordance with the present invention, a lane keeping system may ascertain a course of a lane on the basis of a lane marking. However, if the lane marking is dirty, deformed or not entirely present, then a lane course ascertained on the basis of this lane marking may deviate from an actual lane course. Such deviations may advantageously be avoided by designing the lane keeping system to distinguish between intact and damaged lane markings. To that end, the lane keeping system may record a particular course of two markings of the lane. If, at this point, one of the courses is recognized as being intact, then it may be used for ascertaining the course of the lane. Thus, the lane keeping system is very insensitive to different lane conditions. Any risk of accident may also be thereby lowered.

A method is presented for determining a lane course of a vehicle, the method including the following:
recording a first marking course of a first marking of the lane and a second marking course of a second marking of the lane;
checking the first marking course and the second marking course for plausibility in order to determine a plausible marking course; and
determining the lane course on the basis of a previous lane width and a plausible marking course if at least one marking course proves to be implausible in the checking step.

A lane course may be understood to be a straight line or curved course of a lane, for example. A lane may be a traffic lane of a vehicle, for instance on a road or expressway. A vehicle may be a motor vehicle, such as an automobile, truck, bus or construction vehicle. A course of the lane may be indicated by corresponding lane markings. The lane markings may extend along the lane, for example, and mark a width thereof. In this case, the lane markings may have a continuous or interrupted marking course. The lane markings may also have an irregular marking course, for instance because of wear or lane damage. A plausibility of a marking course may be understood to be a degree of correspondence of a recorded marking course with a predefined marking course. A marking course may prove to be implausible when the degree of correspondence is too small. In such a case, a marking course recognized as being plausible may be used to determine the course of the lane. Moreover, a previous lane width may be considered when determining the course of the lane. A previous lane width may be understood to refer to the lane width information most recently stored. For example, the lane width may be ascertained on the basis of the distance between the marking courses. The lane course may be determined in the form of information on a middle of the lane or, in particular in curves, in the form of an ideal course of the lane.

Using the described approach, lane keeping systems may be improved, in particular near construction sites, when the lane markings are deformed by a fishtailing truck, for instance, and are no longer in the original state thereof. For example, the lane markings then extend in a curved shape or are missing entirely.

In this regard, a lane width, as well as a course of the two individual lane edges may be recorded and continuously monitored. In addition, an algorithm for determining a center of a lane and an ideal course may be modified in response to an altered or missing lane marking.

The described approach may advantageously allow the lane keeping system to be adapted to different situations and thus provides enhanced safety for lane keeping systems.

One specific embodiment of the present approach provides that the previous lane width also be included in the recording step. The previous lane width may be a function here of a distance between the first and second lane marking. The lane course may be determined highly accurately and reliably on the basis of the previous lane width.

Moreover, a further marking course of a further lane marking of a further lane adjoining the lane may be included in the recording step. In this connection, the further marking course may be checked for plausibility in the checking step. In the determining step, the lane course may also be determined on the basis of the further marking course when the further marking course proves to be plausible in the checking step. Here the advantage is derived that the lane course may also be determined on the basis of the further marking course when both the first, as well as the second marking course prove to be implausible in the checking step, for instance because both marking courses are not present.

Moreover, a further lane width of the further lane may be included in the recording step. In this case, the further lane width may be a function of a distance between the further lane marking and one of the markings of the lane. In the determining step, the lane course may also be determined on the basis of the further lane width. This specific embodiment makes it possible to further enhance the accuracy and reliability of the method.

A reference position of a further vehicle relative to the lane and/or the vehicle may also be included in the recording step. The lane course may also be determined in the determining step on the basis of the reference position. A reference position may be understood to be a position of a further vehicle, from which inferences may be made about a possible lane course. A further vehicle may be understood to be a vehicle located in a field surrounding the vehicle. In particular, the further vehicle may be a vehicle driving ahead of the vehicle. On the basis of the reference position, the lane course may be advantageously determined independently of the marking courses. A substantial robustness of the method is thereby attainable.

The method may include a step of generating a warning signal to alert a driver of the vehicle of an accident risk in response to at least one marking course proving to be implausible in the checking step or in response to the determining step being executed. The warning signal makes it possible for the driver to be notified in time about the accident risk. The driver's safety may thus be further enhanced.

The method may also include a step of outputting a suggestion signal in order to recommend a lane change to the driver in response to at least one marking course proving to be implausible in the checking step or in response to the determining step being executed. This also makes it possible to enhance the driver's safety using means that are to be readily and cost-effectively provided.

A further specific embodiment of the present approach provides that the method include a step of reducing a velocity of the vehicle in response to at least one marking course proving to be implausible in the checking step or in response to the determining step being executed. Reducing the velocity may significantly prolong the driver's reaction time and thereby lower any risk of accident.

Moreover, a surface structure of the lane may also be captured in the recording step in order to ascertain a passable area of the lane. The lane course may also be determined here in the determining step on the basis of the passable area. A surface structure may be understood to be a structure of a drivable pavement of the lane. The surface structure may be a texture of an asphalt of the lane, for example. The surface structure of the lane may be used to differentiate the lane from an unpaved edge area having a different surface structure, for example. This specific embodiment also provides the safety-enhancing advantage of a determination of the lane course that is independent of the marking courses.

Finally, the present approach provides a device for determining a course of a lane of a vehicle, the device having the following features:
a unit for capturing a first marking course of a first marking of the lane and a second marking course of a second marking of the lane;
a unit for checking the first marking course and the second marking course for plausibility in order to determine a plausible marking course; and
a unit for determining the lane course on the basis of a previous lane width and a plausible marking course when at least one marking course proves to be implausible.

In the present context, a device may be understood to be an electrical device that processes sensor signals and outputs control and/or data signals as a function thereof. The device may have an interface which may be implemented in hardware and/or software. When implemented in hardware, the interfaces may, for example, be part of what is commonly known as an ASIC system that includes a wide variety of functions of the device. However, the interfaces may also be separate integrated circuits or be at least partly composed of discrete components. When implemented in software, the interfaces may be software modules that are present on a microcontroller, for example, in addition to other software modules. This design variant of the present invention in the form of a device makes it possible for the object of the present invention to be achieved rapidly and efficiently.

Also advantageous is a computer program product having program code, which may be stored on a machine-readable medium, such as a semiconductor memory, a hard-disk memory or an optical memory, and is used to implement the method in accordance with one of the specific embodiments described above when the program product is executed on a computer or a device.

BRIEF DESCRIPTION OF THE DRAWINGS

The present invention is described in greater detail below with reference to the figures.

DETAILED DESCRIPTION OF THE EXAMPLE EMBODIMENTS

Figure 1:
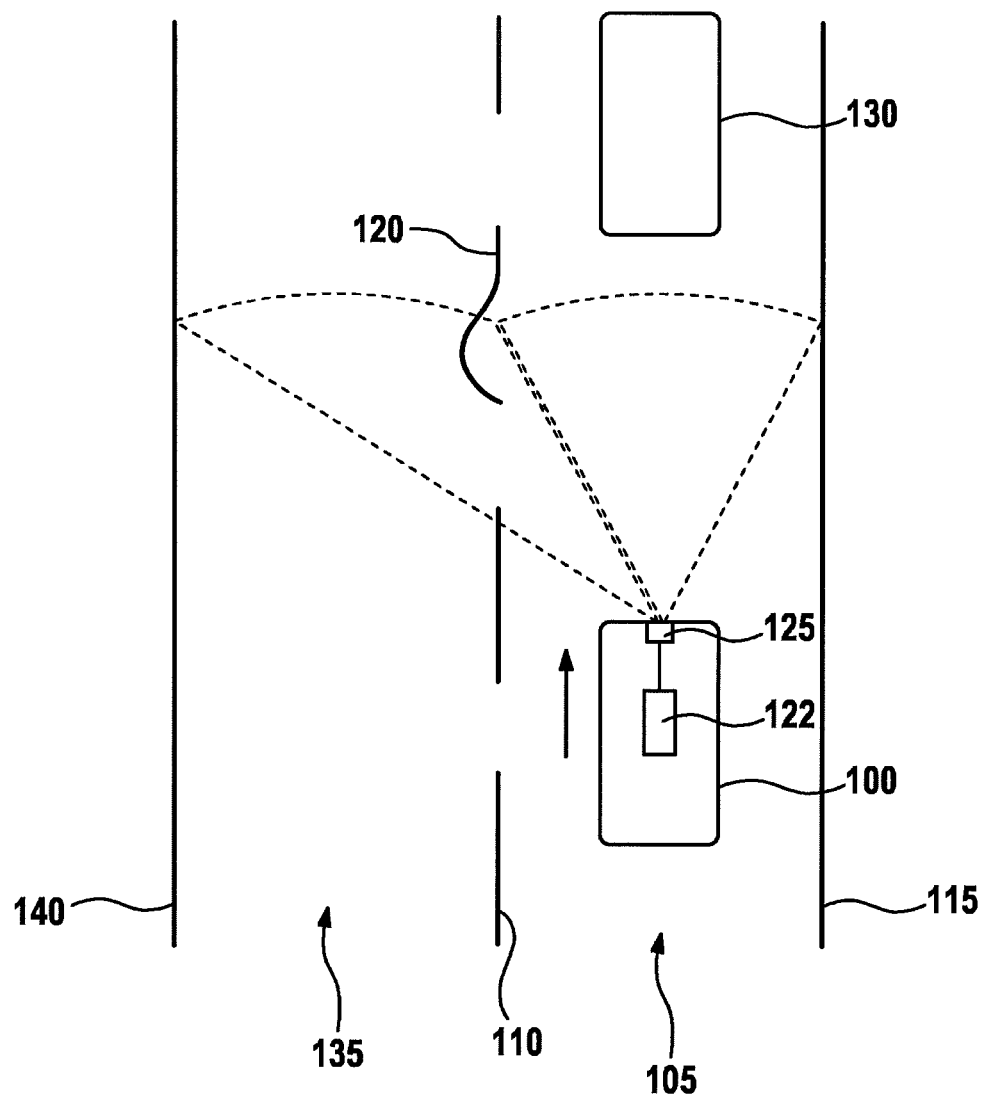
FIG. 1 shows a schematic view of a lane detection situation in accordance with an exemplary embodiment of the present invention.

The following description of advantageous exemplary embodiments of the present invention employs the same or similar reference numerals for the elements that are shown in the various figures and whose function is similar, there being no need to repeat the description of these elements.

FIG. 1 shows a schematic view of a lane detection situation in accordance with an exemplary embodiment of the present invention. A vehicle 100 is located on a lane 105. Lane 105 has a straight line lane course. A width of lane 105 is bounded by a first lane marking 110 and a second lane marking 115. Lane markings 110, 115 each extend in a straight line along lane 105. In addition, first lane marking 105 exhibits a continuous course, and second lane marking 110 a regularly interrupted course. Viewed in a travel direction of vehicle 100, first lane marking 110 is configured to the left of vehicle 100, and second lane marking 115 to the right of vehicle 100. The travel direction is illustrated by an arrow in FIG. 1.

In a region in a near field in front of vehicle 100, first lane marking 110 has a damaged marking strip 120. Here, marking strip 120 extends in a curved shape.

Vehicle 100 includes a device 122 that is adapted for detecting damaged marking strip 120 and for determining lane course 105, for example, on the basis of the course of undamaged lane marking 115.

To capture the respective courses of lane markings 110, 115, vehicle 100 is equipped with a driving environment sensor 125, for example. Driving environment sensor 125 is linked to device 192 and sketched in in the area of a front end of vehicle 100. In addition, driving environment sensor 125 is directed at the near field in front of vehicle 100. In FIG. 1, dashed lines mark a sensing range of driving environment sensor 125.

An exemplary embodiment of the present invention provides that device 122 be adapted for sensing a width of lane 105, for example, using driving environment sensor 125, the width corresponding to a distance between lane markings 105, 115. The lane course may be determined by device 122, additionally with reference to the width.

Another vehicle 130 is additionally located in front of vehicle 100. Device 192 is optionally adapted for capturing a position of further vehicle 130 relative to vehicle 100 and/or relative to lane 105. Alternatively or additionally, device 122 uses this position to determine the lane course.

Another lane 135 is contiguous to lane 105. Further lane 135 is bounded by a further lane marking 140, first lane marking 110 being configured as the median strip between further lane marking 140 and second lane marking 115. Further lane marking 140 extends parallel to lane markings 110, 115 and exhibits a continuous course, in the same way as second lane marking 115.

An exemplary embodiment of the present invention provides that device 122 be adapted for determining the lane course on the basis of a course of further lane marking 140.

In this case, driving environment sensor 125 captures further lane marking 140, for example. To this end, driving environment sensor 125 has a corresponding further sensing range. Further sensing range is likewise marked with dashed lines.

In accordance with another exemplary embodiment, driving environment sensor 125 captures a width of further lane 135, the width of further lane being bounded by a distance between further lane marking 140 and first lane marking 110. The width of further lane 135 is alternatively or additionally used by device 122 in order to determine the course of lane 105.

An exemplary embodiment of the present invention provides that a video image be continuously used to determine and track a distance between two lane boundaries 110, 115, also referred to as lane markings, road markings, side markings or markings 110, 115, 140.

A further refinement optionally provides that a measurement and a monitoring of a progression in the width of adjacent lanes, such as of further lane 135, be recorded as well.

Besides recording the lane widths, the course of lane markings 110, 115 is separately tracked to the right and left and straightened in portions thereof by an interpolation. If it is recognized during the monitoring that a marking exhibits an implausible course, for example, if sudden, short right-left fluctuations, a break and/or a hook occur, while another marking continues to extend in a straight line, then the lane keeping assistance system, for instance in the form of device 122, is exclusively oriented to the marking having the intact course. For correct positioning, the last lane width determined is used until the other side marking again exhibits a plausible course. The monitoring and determination of the lane width is continued subsequently thereto. If, for example, right lane marking 115 is completely missing at a construction site, for instance because a truck has spun out of lane 105 and, in the process, has wiped out marking 115, then the above procedure is performed, i.e., the orientation is carried out on the basis of the intact marking.

If both markings 110, 115 are missing, then the orientation follows on the basis of the adjacent (still intact) markings (in FIG. 1, on the basis of further marking 140).

If indicated, a lane change recommendation is output to the driver.

If there is traffic ahead, a driving environment sensor system, such as driving environment sensor 125, may include a vehicle driving ahead, shown in FIG. 1 exemplarily as a further vehicle 130, as an additional orientation guide.

If the video processor has excellent computing power, then, in addition to the functions described above, various textures of road surface 105 may be analyzed. A texture analysis makes it possible to recognize where the road-surface covering ends and where, for example, mud or grassland (open ground) begins in the image. This may then be considered as well, as an additional orientation guide in the lane positioning.

As soon as the function takes effect, at least, however, when both lane markings 110, 115 are missing, the driver should additionally be warned, since there is then an elevated risk of accident.

In this case, the velocity may optionally be automatically reduced by 20 percent, for example.

Figure 2:
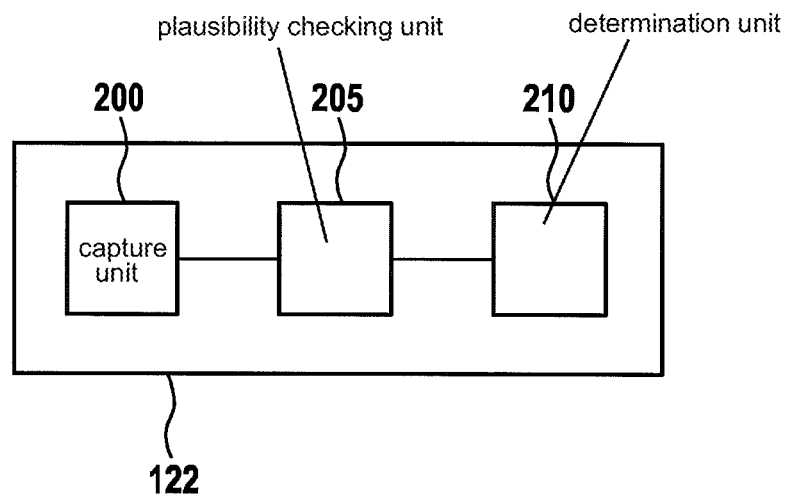
FIG. 2 shows a schematic view of a device for determining a lane course in accordance with an exemplary embodiment of the present invention.

FIG. 2 shows a schematic view of a device for determining a lane course in accordance with an exemplary embodiment of the present invention. The device is device 122 shown, for example, in FIG. 1. Device 122 has a unit 200 for capturing a first marking course of a first marking of the lane and a second marking course of a second marking of the lane, for example of the lane shown in FIG. 1. Unit 200 is linked to a unit 205 for checking the first marking course and the second marking course for plausibility. Moreover, unit 205 is connected to a unit 210. Unit 210 is adapted for determining the lane course on the basis of a previous lane width and a plausible marking course when at least one marking course proves to be implausible. The implausible marking course may be the course of first lane marking 110 that is degraded by marking location 120.

Device 122 is optionally adapted for providing a warning signal for outputting a warning message to a driver of vehicle 100 and/or a suggestion signal for outputting a lane change recommendation to the driver in response to unit 205 recognizing the course of first lane marking 110 as implausible or in response to activation of unit 210.

An exemplary embodiment provides that device 122 be adapted for reducing a velocity of vehicle 100 in response to unit 205 recognizing the course of first lane marking 110 as implausible or in response to activation of unit 210.

Figure 3:
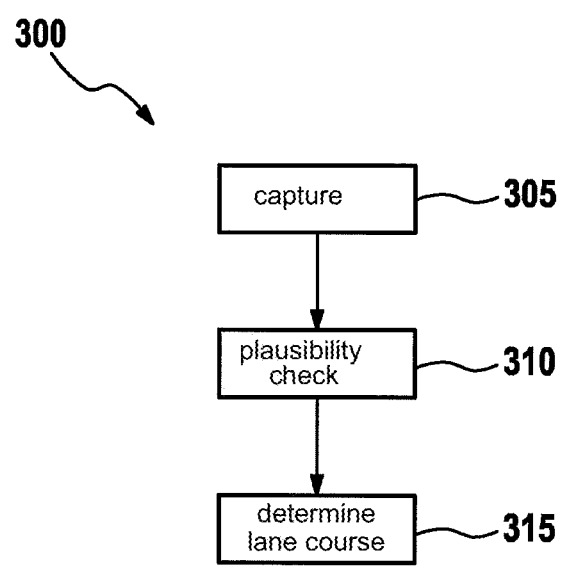
FIG. 3 shows a flow chart of a method for determining a lane course in accordance with an exemplary embodiment of the present invention.

FIG. 3 shows a flow chart of an example method 300 for determining a lane course in accordance with an exemplary embodiment of the present invention. A first marking course of a first marking of a lane and a second marking course of a second marking of the lane are initially captured in a step 305. A step 310 follows for checking the first marking course and the second marking course for plausibility. In a further step 315, the lane course is determined on the basis of a previous width of the lane and a plausible marking course in response to at least one marking course proving to be implausible in the checking step.

The described exemplary embodiments shown in the figures are selected only exemplarily. Various exemplary embodiments may be combined with one another entirely or in terms of individual features. An exemplary embodiment may also be supplemented by features of another exemplary embodiment.

In addition, inventive method steps may be repeated and be executed in a sequence other than that described.

If an exemplary embodiment includes an "AND/OR" logic operation between a first feature and a second feature, then this is to be read as the exemplary embodiment in accordance with a first specific embodiment having both the first feature, as well as the second feature and, in accordance with another specific embodiment, either only the first feature or only the second feature.

What is claimed is:

1. A method of a lane keeping system that uses a course of a lane of a vehicle, the method comprising:
   recording, by a camera, at least one image of a first marking of the lane to a first lateral side of the vehicle and of a second marking of the lane to a second, opposite, lateral side of the vehicle;
   determining, by processing circuitry and in a first determination, a width of the lane between the first marking of the lane and the second marking of the lane;
   storing, by the processing circuitry, the determined width of the lane;
   performing the following by the processing circuitry processing the at least one image recorded by the camera:
      interpolating the first marking to define an extended course of the first marking of the lane;
      interpolating the second marking to define an extended course of the second marking of the lane;

identifying a veering section of the first marking that veers from the interpolated extended course of the first marking; and in a second determination, determining whether the second marking includes a veering section that veers from the interpolated extended course of the second marking in a manner that corresponds to the veering of the veering section of the first marking from the interpolated extended course of the first marking;

in a third determination and based on a negative result of the second determination, determining, by the processing circuitry, an implausibility of a definition of the lane course that is based on the veering section of the first marking;

responsive to the determination of the implausibility, the processing circuitry determining the lane course based on the determined width of the lane stored in the storing step; and based on the determined lane course, the processing circuitry at least one of outputting a lane keeping warning and controlling a driving of the vehicle.

2. The method in accordance with claim 1, wherein the previous lane width is also recorded in the recording step, the previous lane width being a function of a distance between the first marking and the second marking.

3. The method as recited in claim 1, wherein a further marking course of a further marking of a further lane adjoining the lane is recorded in the recording step, the further marking course being checked for plausibility, and, based on a determination that the further marking course is plausible, the lane course is determined additionally based on the further marking course.

4. The method as recited in claim 3, wherein a further lane width of the further lane is also recorded in the recording step, the further lane width being a function of a distance between the further lane marking and one of the first or second markings of the lanes, the lane course also being determined based on the further lane width.

5. The method as recited in claim 1, wherein a reference position of a further vehicle relative to at least one of the lane and of the vehicle is also recorded in the recording step, the lane course also being determined on the basis of the reference position.

6. The method as recited in claim 1, wherein the outputting is performed and includes generating a warning signal to alert a driver of the vehicle of an accident risk.

7. The method as recited in claim 1, wherein the outputting is performed and includes outputting a suggestion signal indicating a recommendation for a lane change.

8. The method as recited in claim 1, wherein the controlling of the driving is performed and includes reducing a velocity of the vehicle.

9. The method as recited in claim 1, wherein a surface structure of the lane is also captured in the recording step in order to ascertain a passable area of the lane, the lane course also being determined in the determining step on the basis of the passable area.

10. A lane keeping system that uses a course of a lane of a vehicle, the system comprising:

a camera; and processing circuitry communicatively coupled to the camera;

wherein:

the camera is configured to record at least one image of a first marking of the lane to a first lateral side of the vehicle and of a second marking of the lane to a second, opposite, lateral side of the vehicle; and the processing circuitry is configured to perform the following:

in a first determination, determine a width of the lane between the first marking of the lane and the second marking of the lane;

store the determined width of the lane;

obtain the at least one image from the camera;

process the obtained at least one image;

based on the processing of the obtained at least one image:

interpolate the first marking to define an extended course of the first marking of the lane;

interpolate the second marking to define an extended course of the second marking of the lane;

identify a veering section of the first marking that veers from the interpolated extended course of the first marking; and in a second determination, determine whether the second marking includes a veering section that veers from the interpolated extended course of the second marking in a manner that corresponds to the veering of the veering section of the first marking from the interpolated extended course of the first marking;

in a third determination and based on a negative result of the second determination, determine an implausibility of a definition of the lane course that is based on the veering section of the first marking;

responsive to the determination of the implausibility, determine the lane course based on the stored determined width of the lane; and based on the determined lane course, the processing circuitry at least one of outputting a lane keeping warning and controlling a driving of the vehicle.

11. A non-transitory computer-readable storage medium storing a program code that (a) is executable by processor of a lane keeping system that uses a course of a lane of a vehicle and (b) when executed by a processor, causes the processor to perform a method, the method comprising:

obtaining from a camera at least one image of a first marking of the lane to a first lateral side of the vehicle and of a second marking of the lane to a second, opposite, lateral side of the vehicle;

in a first determination, determining a width of the lane between the first marking of the lane and the second marking of the lane;

storing the determined width of the lane;

performing the following by processing the obtained at least one image:

interpolating the first marking to define an extended course of the first marking of the lane;

interpolating the second marking to define an extended course of the second marking of the lane;

identifying a veering section of the first marking that veers from the interpolated extended course of the first marking; and in a second determination, determining whether the second marking includes a veering section that veers from the interpolated extended course of the second marking in a manner that corresponds to the veering of the veering section of the first marking from the interpolated extended course of the first marking;

in a third determination and based on a negative result of the second determination, determining an implausibility of a definition of the lane course that is based on the veering section of the first marking;

responsive to the determination of the implausibility, determining the lane course based on the determined width of the lane stored in the storing step; and based on the determined lane course, outputting a lane keeping warning and controlling a driving of the vehicle.

12. The method in accordance with claim 1, wherein the first and second marking courses are determined by interpolation of sections of the first and second markings, respectively.

13. The method in accordance with claim 1, wherein the first lateral side is a left side of the vehicle and the second lateral side is a right side of the vehicle.

14. A method of a lane keeping system that uses a course of a lane of a vehicle, the method comprising:

recording, by a camera, at least one image of a first marking of the lane and of a second marking of the lane;

determining, by processing circuitry, a width of the lane between the first marking of the lane and the second marking of the lane;

storing the determined width of the lane;

by the processing circuitry processing the at least one image recorded by the camera, the processing circuitry interpolating the first marking to define an extended course of the first marking of the lane and interpolating the second marking to define an extended course of the second marking of the lane;

determining, by the processing circuitry, an implausibility of at least one of the interpolated extended course of the first marking and the interpolated extended course of the second marking;

responsive to the determination of the implausibility, the processing circuitry determining the course of the lane based on the stored determined width of the lane and a plausible marking course; and based on the determined lane course, the processing circuitry at least one of outputting a lane keeping warning and controlling a driving of the vehicle.

15. A method of a lane keeping system that uses a course of a lane of a vehicle, the method comprising:

recording, by a camera, at least one image of a first marking of the lane to a first lateral side of the vehicle and of a second marking of the lane to a second, opposite, lateral side of the vehicle;

determining, by processing circuitry, a width of the lane between the first marking of the lane and the second marking of the lane;

storing the determined width of the lane;

the processing circuitry processing the at least one image recorded by the camera to interpolate the first marking to define an extended course of the first marking of the lane and interpolate the second marking to define an extended course of the second marking of the lane;

comparing, by the processing circuitry, (a) at least one of the interpolated extended courses of the first and second markings of the lane to (b) a predefined marking course to determine a degree of correspondence between them;

determining, by the processing circuitry, an implausibility of at least one of the interpolated extended courses based on the determined degree of correspondence being less than a predefined threshold;

responsive to the determination of the implausibility, the processing circuitry determining the lane course based on the stored determined width of the lane; and based on the determined lane course, the processing circuitry at least one of outputting a lane keeping warning and controlling a driving of the vehicle.

* * * * *